United States Patent [19]

Sakai

[11] Patent Number: 4,627,313
[45] Date of Patent: Dec. 9, 1986

[54] CONTROL SYSTEM FOR AN INFINITELY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 696,000

[22] Filed: Jan. 29, 1985

[30] Foreign Application Priority Data

Jan. 30, 1984 [JP] Japan .................. 59-14750

[51] Int. Cl.$^4$ ............................................. B60K 41/12
[52] U.S. Cl. ....................................... 74/867; 474/28; 474/18
[58] Field of Search .................... 74/868, 867; 474/18, 474/28

[56] References Cited

U.S. PATENT DOCUMENTS 4,369,675  1/1983  van Deursen ........................ 74/864
4,475,416  10/1984 Underwood ........................ 74/868
4,534,243  8/1985  Yokoyama et al. ................. 74/868
4,545,265  10/1985 Abo et al. ............................ 74/868

Primary Examiner—Lawrence J. Staab
Assistant Examiner—Dirk Wright
Attorney, Agent, or Firm—Martin A. Farber

[57] ABSTRACT

A control system for an infinitely variable belt-drive transmission which has a drive pulley having a hydraulically shiftable disc and a servo chamber for shifting the disc, a driven pulley having a hydraulically shiftable disc and a servo chamber for shifting the disc, and a belt engaged with both the pulleys. A hydraulic control circuit is provided for supplying oil to the servo chambers and for draining the servo chambers. A lubricating oil circuit is provided in the hydraulic control circuit for supplying lubricating oil to the drive pulley, and a passage is provided for supplying a part of the lubricating oil to the servo chamber of the drive pulley, thereby filling the servo chamber with the oil before the starting of transmission operation.

3 Claims, 4 Drawing Figures

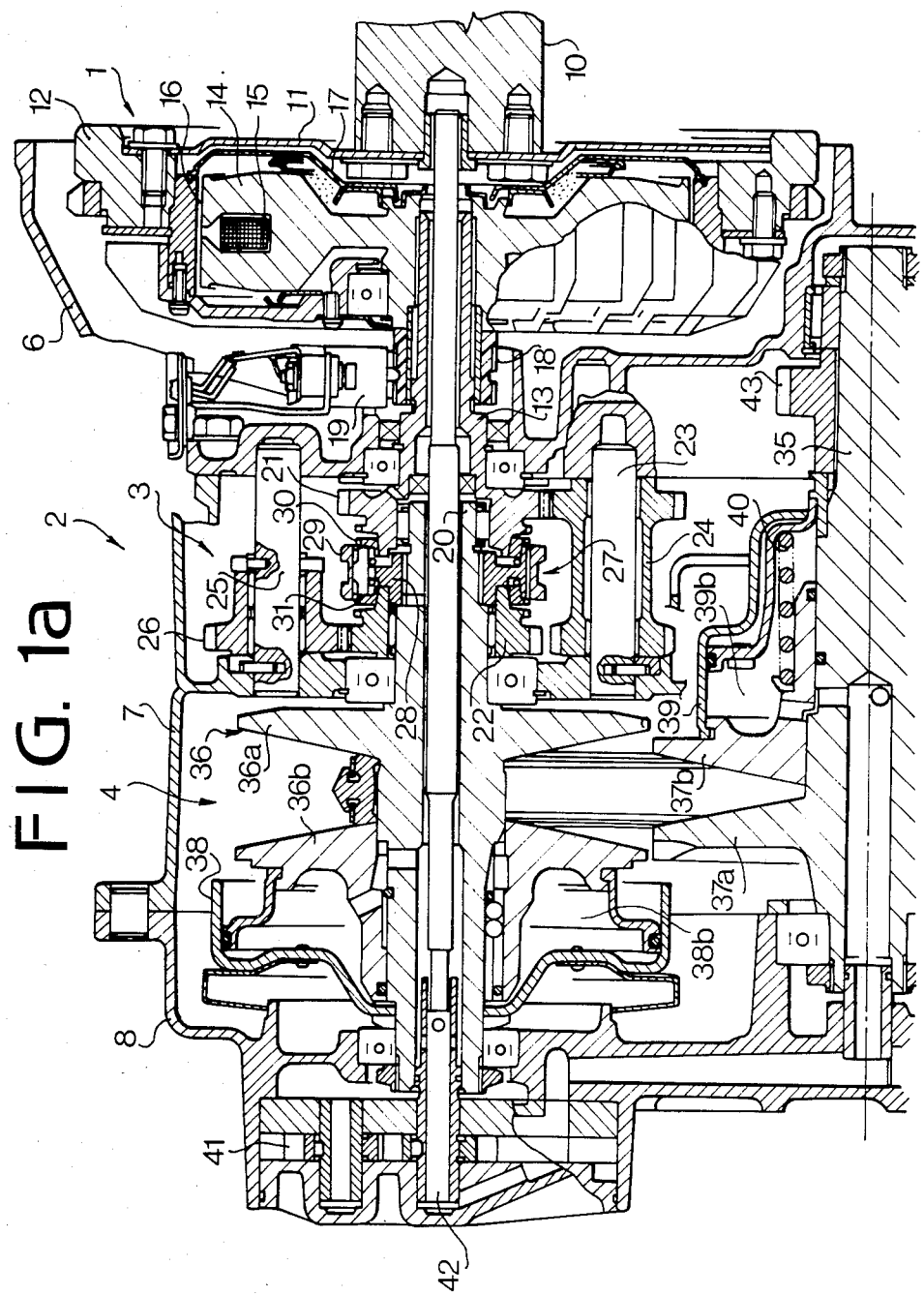

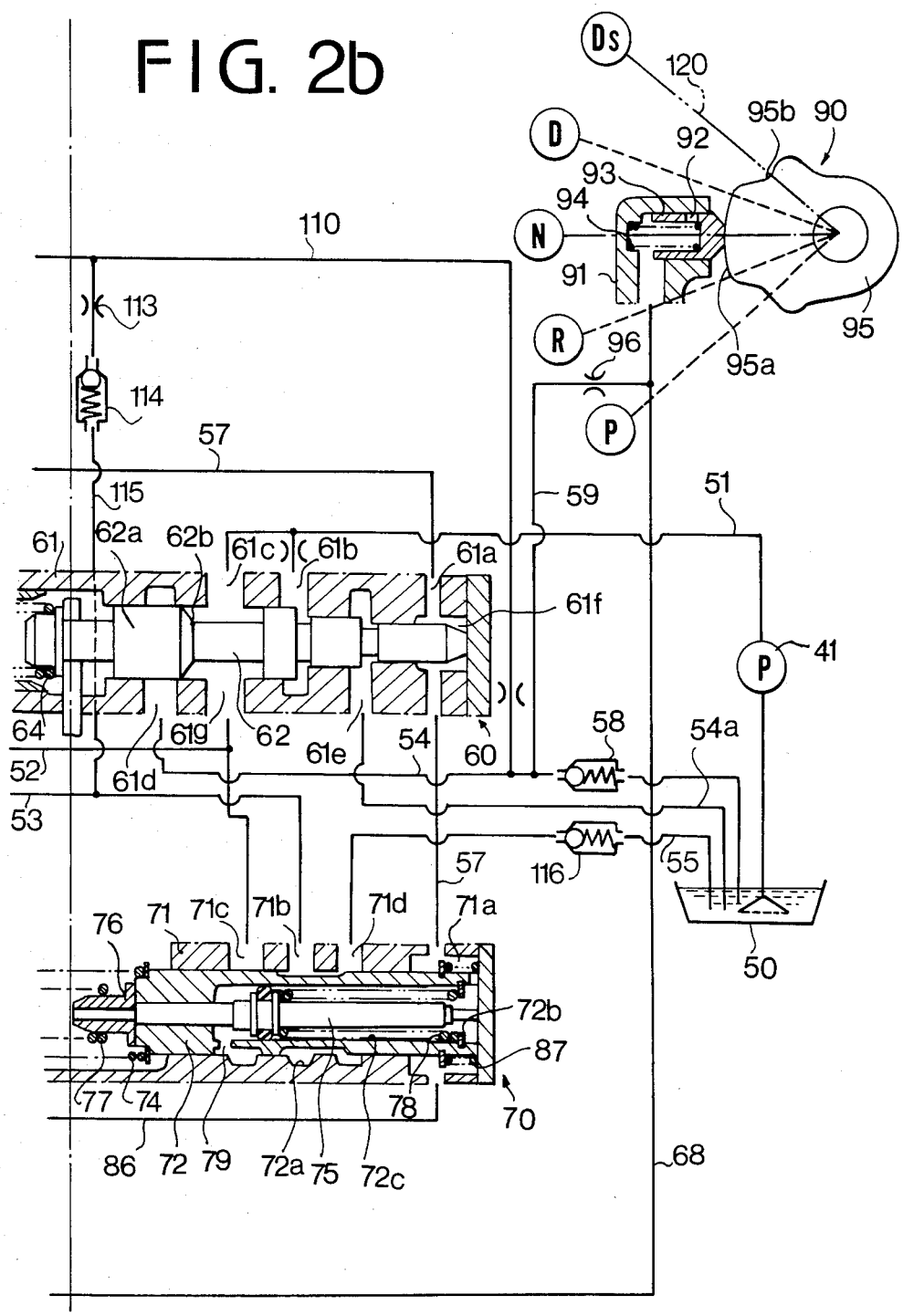

1

CONTROL SYSTEM FOR AN INFINITELY VARIABLE TRANSMISSION

BACKGROUND OF THE INVENTION

The present invention relates to a control system of an infinitely variable belt-drive automatic transmission for a motor vehicle, and particularly to a hydraulic control system for an infinitely variable transmission.

U.S. Pat. No. 4,369,675 discloses a control system for an infinitely variable belt-drive transmission. The transmission comprises an endless belt running over a drive pulley and a driven pulley, each pulley is so designed that the running diameter of the driving belt on the pulleys varies by a hydraulic control system.

In the hydraulic control system, a line pressure of oil is continuously applied to a servo chamber for the driven pulley and further the line pressure is applied to another servo chamber for the drive pulley by a transmission ratio control valve after starting the operation so as to control to upshift the transmission. In the conventional system, before starting the transmission operation, the servo chamber of the drive pulley is communicated with a drain port of the transmission ratio control valve to drain the servo chamber, so as to provide a low speed stage at a maximum transmission ratio.

However, if the servo chamber of the drive pulley is kept draining before the starting of the transmission operation, all or a part of the oil in the servo chamber is discharged, admitting air in the servo chamber. Accordingly, when the line pressure is applied to the servo chamber of the drive pulley through the transmission ratio control valve, the air admitted in the servo chamber is compressed first, and then the pressure of oil elevates to start the upshifting of the transmission, resulting in delays in elevation of the oil pressure and in response of transmission operation. Further, when an accelerator pedal of the vehicle is fully depressed, the upshifting of the transmission starts after the speed of an engine reaches a high value. Accordingly, the drive pulley rotates at high speed under the condition of a small amount of oil in the servo chamber until the upshifting starts, which will cause troubles in sliding portions and sealing parts in the servo device, because of a small amount of oil in the servo chamber.

SUMMARY OF THE INVENTION

Therefore, the object of the present invention is to provide an oil pressure control system of an infinitely variable transmission system which is capable of continuously supplying oil to a servo chamber of a drive pulley to keep the servo chamber filled with oil, thereby quickly starting the transmission operation and preventing the lack of oil for lubricating.

According to the present invention, there is provided a control system for an infinitely variable belt-drive transmission having a selector device including a drive range position and a neutral position, a drive pulley having a hydraulically shiftable disc and a servo chamber for shifting the disc, a driven pulley having a hydraulically shiftable disc and a servo chamber for shifting the disc, and a belt engaged with both the pulleys, a hydraulic control circuit for supplying oil to the servo chambers and for draining the servo chambers, the hydraulic control circuit being provided with a pressure regulator valve for providing a line pressure and a transmission ratio control valve for applying the line pressure to the servo chamber of the drive pulley. The system comprises a lubricating oil circuit provided in the hydraulic control circuit for supplying lubricating oil to the drive pulley, a passage for supplying a part of the lubricating oil to the servo chamber of the drive pulley, a check valve provided in the passage for preventing the reverse flow of the lubricating oil, and a select position detecting valve for enabling the supply of the lubricating oil to the servo chamber at the selection of the neutral position.

In an aspect of the present invention, the lubricating oil circuit is connected to a drain passage, and the select position detecting valve is provided for restricting the drain oil to raise the pressure of the lubricating oil.

The other objects and features of this invention will be apparently understood from the following description with reference to the accompanying drawings.

BRIEF DESCRIPTION OF DRAWINGS

FIGS. 1a and 1b are sectional views of an infinitely variable belt-drive transmission to which the present invention is applied; and FIGS. 2a and 2b are hydraulic control circuits according to the present invention.

DETAILED DESCRIPTION OF THE PREFERRED EMBODIMENT

Figure 1B:
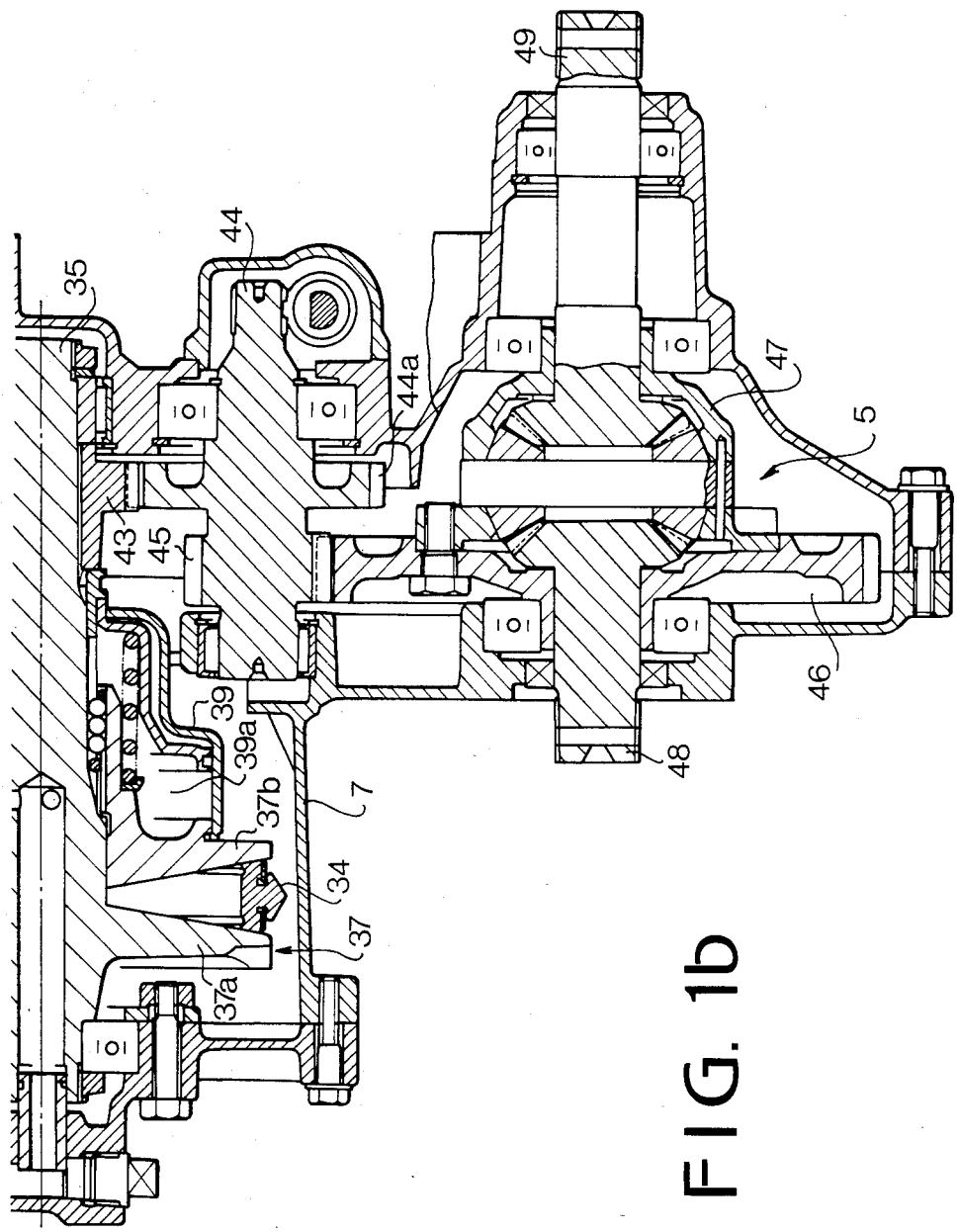

Referring to FIGS. 1a and 1b an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a hydraulic control circuit which will be described hereinafter. The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. Powder of magnetic material is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D range).

When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The hydraulic control circuit is responsive to vehicle speed, engine speed and throttle valve position for controlling the oil from the oil pump 41 to servo devices 38 and 39 thereby to move discs 36b and 37b. Thus, transmission ratio is infinitely changed.

Figure 2A:
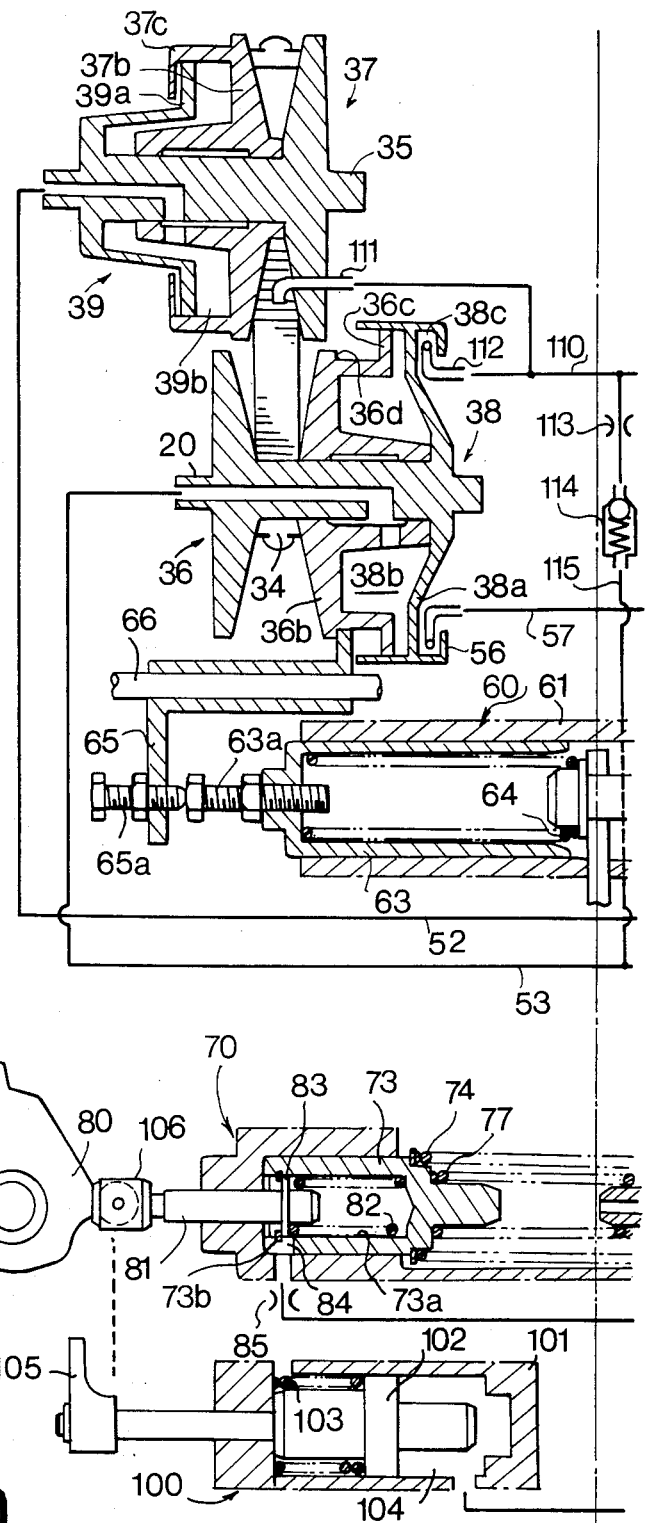

FIGS. 2a and 2b show the hydraulic control circuit according to the present invention. In the servo device 38 of the drive pulley 36, a cylinder 38a integrately formed on the main shaft 20 is engaged with a piston 36c formed on the movable disc 36b, forming a drive pulley servo chamber 38b, into which line pressure is applied. Also, in the other servo device 39 in the driven pulley 37, a cylinder 37c formed integrally with the movable conical disc 37b is engaged with a piston 39a formed on the output shaft 35, forming a driven pulley servo chamber 39b. The movable disc 36b has an area exposed to the line pressure which is larger than the corresponding area of the movable disc 37b. Oil in an oil reservoir 50 is supplied to a pressure regulator valve 60 through a passage 51 by a pump 41. An oil passage 52 from the pressure regulator valve 60 is communicated with the driven pulley servo chamber 39b and also with the drive pulley servo chamber 38b through a transmission ratio control valve 70 and a passage 53. Oil flows back to the oil reservoir 50 through drain passages 54 and 55 which are in communication with the valves 60 and 70, respectively. The drive pulley cylinder 38a has an annular inside groove 38c in which a rotation speed sensor 56 in the form of a pitot tube is provided for measuring the speed of the oil in the groove that is the speed of the main shaft 20 which varies dependent on the engine speed. The pitot pressure produced by the rotation speed sensor 56 as a pitot tube is applied to the valves 60 and 70 through a passage 57.

A ball check valve 58 is provided in the drain passage 54 for the pressure regulator valve 60, and the passage is communicated with a select position detecting valve 90 at the upstream of the check valve 58 through a passage 59 and further with an actuator 100 for the transmission ratio control valve 70 through a passage 68.

The pressure regulator valve 60 comprises a valve body 61, a spool 62, a spring 64 provided between a spring retainer 63 and one end of the spool 62 for urging the spool 62 to the right. A sensor shoe 65 for detecting the actual transmission ratio is slidably mounted on a lubricating oil pipe 66 which is parallel with the axis of the spool 62. A bolt 65a secured to an end of the sensor shoe 65 engages with an end of a bolt 63a secured to the spring retainer 63, and the other end of the sensor shoe 65 engages with an outside periphery 36d of the movable disc 36b. Thus, the position of the movable disc 36b which means the transmission ratio during the operation is transmitted to the spool 62 through the spring 64. At the end of the valve body 61, opposite to the spring 64, pitot pressure is applied to an end chamber 61f through the oil passage 57 and a port 61a, and pump oil pressure is applied to a chamber 61b through the passage 51. The passage 51 is communicated with the passage 52 through a ports 61c and 61g. A chamber 61d and a chamber 61e, which is provided between the chambers 61f and 61b for preventing the leakage of the oil from affecting on the pitot pressure, are communicated with the oil reservoir 50 through drain passages 54 and 54a. The port 61d is communicated with the port 61g through a chamber formed on a land 62a of the spool 62 so that the line pressure can be regulated.

Thus, the spool 62 is applied with the pitot pressure and pump oil pressure so as to be moved in the direction to open the port 61d, whereas the elastic force of the spring corresponding to the transmission ratio detected by the sensor shoe 65 urges the spool 62 in the direction to close the port 61d. Accordingly, high line pressure generates at the port 61c at a low engine speed with a large transmission ratio. The sensor shoe 65 is moved to the left in FIG. 2a as the transmission ratio decreases, reducing the force of the spring 64 to lower the line pressure. The line pressure exerts on the belt 34 at a proper force dependent on the transmission ratio so as not to cause the belt to slip on the pulleys.

The transmission ratio control valve 70 comprises a valve body 71, a spool 72, an operating plunger 73, and a spring 74 provided between the spool 72 and the plunger 73. A chamber 71a is communicated with the passage 57 to be applied with the pitot pressure. The control valve 70 further comprises a port 71b communicated with passage 53, a port 71c communicated with the passage 52, a port 71d communicated with the passage 55, an annular groove 72a formed on the spool 72 so as to communicate the ports 71b and 71c or 71b and 71d for supplying or discharging line pressure to or from the drive pulley servo chamber 38b in dependence on the position of the spool 72. A regulator spring 77 is provided between the operating plunger 73 and a retainer 76 securely mounted on a projecting end of a regulator plunger 75 which is slidably provided in an axial cavity 72c in the spool 72. A spring 78 is provided between a flange of the plunger 75 and a retainer 72b of the spool 72. The force of the regulator spring 77 is decided by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 83 of the rod 81 is slidably engaged with the wall of the cavity 73a. A small spring 82 is provided between the flange 83 and the plunger 73, and the flange 83 engages with a stopper 73b secured to the plunger. The cavity 73a is applied with the pitot pressure through a port 84 and a passage 86 having an orifice 85 and communicated with the chamber 71a. A spring 87 is provided between an end of the spool 72 and the valve body 71 to adjust the load on the spring 82. An end of the rod 81 engages with a cam 80 which is operatively connected to an accelerator pedal of the vehicle so as to be rotated in dependence on the depression of the pedal.

When the spool 72 is moved by the pitot pressure to communicate the port 71b with port 71c, the line pressure is applied to the servo chamber 38b of the drive pulley 36 to upshift the transmission. On the other hand, when the port 71b communicates with the port 71d, the chamber 38b is drained to downshift.

The select position detecting valve 90 comprises a valve body 91, a valve 93 having a drain aperture 92 which is slidably mounted in the valve body 91, a spring 94 for urging the valve 93 to a cam 95 which rotates according to the position of a selector lever 120. The cam 95 has a lobe 95a which is corresponding to D, N, R range positions, and indentations 95b formed in the both sides of the lobe 95a, corresponding to P, Ds range positions. At the D, N, R range positions, the lobe 95 pushes the valve 93 in the direction to close the drain aperture 92, so that actuating oil pressure is built up. At the P, Ds range positions, the valve 93 moves outwards to open the drain aperture 92, so that the lubricating oil pressure in the passages 54, 59 is lowered. At that time the oil pressure decreases gradually, because of an orifice 95 provided in the oil passage 59.

The actuator 100 comprises a cylinder 101, a piston 102 which is slidably mounted in the cylinder 101, and a spring 103 for urging the piston 102 to a piston chamber 104 to which actuating oil pressure is applied through the passage 68. Further, a hook portion 105 formed at the outer end of the piston is engageable with a pin 106 on the rod 81 of the transmission ratio control valve 70. At the P range or Ds range, since no actuating oil pressure exists, piston 102 presses the rod 81 to the right in FIG. 2a, controlling the transmission zone to the side of high engine revolution. Thus, the releasing of the acceleration pedal at Ds range causes the downshift of the transmission, so that the engine braking effects. A lubricating oil supply nozzle 111 is provided adjacent the belt 34 and another lubricating oil supply nozzle 112 is provided in the groove 38c. Both nozzles are communicated with the drain passage 54 by a lubricating oil passage 110, so that the lubricating oil is supplied to the belt 34 and the groove 38c.

In accordance with the present invention, the passage 110 is communicated with the passage 53 by a passage 115 having an orifice 113 and a check valve 114. When the pressure of the lubricating oil in the passage 110 is higher than the line pressure in the servo chamber 38b because of the drain of the chamber, the lubricating oil is supplied to the servo chamber 38b passing through orifice 113, check valve 114, passages 115 and 53. To the contrary, when the pressure of the line pressure in the servo chamber 38b is higher than the lubricating oil, the check valve 114 closes, thereby preventing the discharge of the oil in the servo chamber.

On the other hand, a check valve 116 having a small spring force is provided in the drain passage 55 so as to prevent the discharge of the oil from the control valve 70.

In operation of the system, while the vehicle is at a stop, the driven pulley servo chamber 39b is supplied with the line pressure adjusted by the pressure regulator valve 60 through the passages 51, 52, and the drive pulley servo chamber 38b is drained, since the spool 72 is at the right end position by the spring 74. Thus, in the pulley and belt device 4 of the definitely variable belt-drive transmission 2, the driving belt 34 engages with the driven pulley 37 at a maximum running diameter to provide the largest transmission ratio (low speed range).

On the other hand, the selector lever 120 is at the N range position to select the N range, so that the drain aperture 92 of the select position detecting valve 90 is closed. Accordingly, the pressure of the lubricating oil in the passage 110 is kept at a predetermined pressure to supply the lubricating oil to the belt 34 and groove 38c. As described above, when the pressure of the oil in the servo chamber 38b is lower than the lubricating oil, the lubricating oil is supplied to the chamber through passages 115 and 53 to fill the chamber with the oil. On the other hand, the oil in the passage 53 is regulated by the check valve 116 in the drain passage 55, so that the pressure of the oil in the servo chamber is kept at a low value slightly higher than zero. Thus, the entering of air into the servo chamber 38b can be prevented. When the D range is selected, the input shaft 35 and the main shaft 20 are connected to each other in the selector device 3 by the selector lever 120. When the acceleration pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels through the final reduction device 5. Thus, the vehicle is started.

When the pitot pressure rises, the spool 72 is shifted to the left, so that the line pressure is applied to the servo chamber 38b to move the disc 36b to the left. Thus, the upshift of the transmission starts. Since the line pressure is higher than the lubricating oil, the check valve 114 is closed, so that the oil is supplied to the chamber 38b without draining. At that time, since the servo chamber 38b is filled with the oil, the disc 36b is immediately shifted to upshift the transmission.

It will be understood that even if the check valve 116 is omitted, the same operation can be performed by positioning the drain passage 55 at a position higher than the servo chamber 38b.

While the presently referred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for an infinitely variable belt-drive transmission having a selector device including a drive range position and a neutral position, a drive pulley having a hydraulically shiftable disc and a servo chamber for shifting the disc, a driven pulley having a hydraulically shiftable disc and a servo chamber for shifting the disc, and a belt engaged with both the pulleys, a hydraulic control circuit for supplying oil to the servo chambers and for draining the servo chambers, the hydraulic control circuit being provided with a pressure regulator valve for providing a line pressure and a transmission ratio control valve for applying the line pressure to the servo chamber of the drive pulley, the improvement comprising:

a lubricating oil circuit provided in the hydraulic control circuit for supplying lubricating oil to the drive and driven pulleys;

a passage for supplying a part of the lubricating oil to the servo chamber of the drive pulley;

a check valve provided in the passage for preventing the reverse flow of the lubricating oil; and a select position detecting valve for enabling the supply of the lubricating oil to the servo chamber at the selection of the neutral position.

2. The control system according to claim 1 wherein the lubricating oil circuit is connected to a drain passage, and the select position detecting valve is provided for restricting the drain oil to raise the pressure of the lubricating oil.

3. The control system according to claim 1 further comprising means for restricting the drain from the transmission ratio control valve.

* * * * *